United States Patent
Khajeh et al.

(10) Patent No.: US 10,094,945 B2
(45) Date of Patent: Oct. 9, 2018

(54) FORMATION MEASUREMENTS USING NONLINEAR GUIDED WAVES

(71) Applicants: Ehsan Khajeh, Spring, TX (US); Yang Liu, Spring, TX (US)

(72) Inventors: Ehsan Khajeh, Spring, TX (US); Yang Liu, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 525 days.

(21) Appl. No.: 14/223,416

(22) Filed: Mar. 24, 2014

(65) Prior Publication Data

US 2015/0268367 A1 Sep. 24, 2015

(51) Int. Cl.
*G01V 1/50* (2006.01)
*G01V 1/46* (2006.01)

(52) U.S. Cl.
CPC . *G01V 1/50* (2013.01); *G01V 1/46* (2013.01)

(58) Field of Classification Search
CPC .......................................... G01V 1/50
USPC ........................................... 367/31
See application file for complete search history.

(56) References Cited

U.S. PATENT DOCUMENTS

| 2006/0133205 | A1 | 6/2006 | Van Kuijk et al. | |
| 2007/0064531 | A1 | 3/2007 | Dubose | |
| 2010/0085835 | A1* | 4/2010 | Tang | G01V 1/30 367/32 |
| 2010/0149914 | A1 | 6/2010 | Achanta | |
| 2012/0019394 | A1* | 1/2012 | Loi | E21B 17/006 340/856.4 |
| 2012/0075952 | A1* | 3/2012 | Johnson | G01V 1/46 367/35 |

OTHER PUBLICATIONS

Liu et al., "Third harmonic shear horizontal and Rayleigh Lamb waves in weakly nonlinear plates", AIP, Journal of Applied Physics 114, 114908 (2013); doi: 10.1063/1.4821252, 10 pages.
Liu, et al. "Cumulative second harmonics in weakly nonlinear plates and shells", Health Monitoring of Structural and Biological Systems 2013, edited by Tribikram Kundu, Proc. of SPIE vol. 8695, 86950S, 2013, 12 pages.
Liu, et al., "A Single-Element Transducer with Nonuniform Thickeness for High-Frequency Broadband Applications", IEEE Transactiosn on Ultrasonics, Ferrorelectrics, and Frequency Control, vol. 56, No. 2, Feb. 2009, pp. 379-386.
Liu, et al., "Higher order interaction of elastic waves in weakly nonlinear hollow circular cylinders. I. Analytical foundation", Journal of Applied Physics 115, 214901 (2014), part I, pp. 1-11.

(Continued)

*Primary Examiner* — Daniel L Murphy
(74) *Attorney, Agent, or Firm* — Cantor Colburn LLP (57) ABSTRACT

An embodiment of a method of estimating a property of an earth formation includes: disposing an acoustic tool in a borehole in an earth formation, the acoustic tool including an acoustic source and at least one acoustic receiver; transmitting acoustic signals into the borehole by the acoustic source, the acoustic signals having at least one linear guided wave mode that propagates along a surface of the borehole; receiving the acoustic signals by at least one receiver; analyzing, by a processor, the acoustic signals to measure non-linear harmonic waves generated by the formation is response to the at least one linear guided wave mode; and estimating a property of the formation based on the measured non-linear harmonic waves.

20 Claims, 6 Drawing Sheets

(56) References Cited

OTHER PUBLICATIONS

Liu, et al., "Higher order interaction of eleastic waves in weakly nonlinear hollow circular cylinders. II. Physical Interpretation and numerical results", Journal of Applied Physics 115, 214902 (2014), Part II, pp. 1-10.
Liu, et al., "Interaction of torsional and longitudinal guided waves in weaklynonlinear circular cylinders", 2013 Acoustical Society of America, J. Acoust. Soc. Am. 133 (5), May 2013, pp. 2541-2553.
Liu, et al., "Nonlinear Ultrasonic Guided Waves for Microstructure Characterization ofHollow Cylinders", 13th International Symposium on Nondestructive Characterization of Materials (NDCM-XIII), May 20-24, 2013, Le Mans, France, p. 1-8.
Liu, et al., "On selection of primary modes for generation of strong internally resonant second harmonics in plate", Journal of Sound and Vibration 332, 2013, pp. 4517-4528.
Liu, et al., "Second Harmonic Generation of Guided Waves in Circular Cylinders: Analysis of Axismmetric Torsional and Longitudinal Modes", ASNT 22nd Research Symposium, Dallas TX, Mar. 19-23, 2012, pp. 78-82.
Liu, et al., "Strongly Cumulative Second Harmonic Generationin a Plate With Quadratic Nonlinearity: Finiteelement Simulation", The 39th Annual Review of Progress in Quantitative Nondestructive Evaluation AIP Conf. Proc. 1511, pp. 151-158 (2013).
Notification of Transmittal of the International Search Report and the Written Opinion of the International Searching Authority, or the Declaration; PCT/US2015/021468; dated Jul. 8, 2015; 13 pages.
Rose, Joseph L., "Ultrasonic Guided Waves in Solid Media", Cambridge University Press, 2014;, 36 pages; www.cambridge.org/9781107048959.

\* cited by examiner

FORMATION MEASUREMENTS USING NONLINEAR GUIDED WAVES

BACKGROUND

Formation evaluation is critical for effective management of oil and gas reservoirs. Different physical methods are used for formation evaluation such as acoustics, electromagnetics, nuclear and others. Some evaluation methods are performed downhole during a drilling operation (LWD) or in an existing borehole, e.g., using wireline logging tools. Acoustic logging is one of the major methods used for formation evaluation, and is used to estimate mechanical properties of formations.

SUMMARY

An embodiment of a method of estimating a property of an earth formation includes: disposing an acoustic tool in a borehole in an earth formation, the acoustic tool including an acoustic source and at least one acoustic receiver; transmitting acoustic signals into the borehole by the acoustic source, the acoustic signals having at least one linear guided wave mode that propagates along a surface of the borehole; receiving the acoustic signals by at least one receiver; analyzing, by a processor, the acoustic signals to measure non-linear harmonic waves generated by the formation is response to the at least one linear guided wave mode; and estimating a property of the formation based on the measured non-linear harmonic waves.

An embodiment of a system for estimating a property of an earth formation includes: an acoustic tool configured to be disposed in a borehole in an earth formation, the acoustic tool including an acoustic source configured to generate at least one linear guided wave mode that propagates along a surface of the borehole, and at least one acoustic receiver; and a processor configured to analyze acoustic signals received at the acoustic receiver, measure non-linear harmonic waves generated by the formation in response to the at least one linear guided wave mode, and estimate a property of the formation based on the measured non-linear harmonic waves.

BRIEF DESCRIPTION OF THE DRAWINGS

The following descriptions should not be considered limiting in any way. With reference to the accompanying drawings, like elements are numbered alike.

DETAILED DESCRIPTION

There are provided devices, systems and methods for estimating earth formation characteristics including mechanical properties of earth formations. An embodiment of a method includes transmitting acoustic signals to generate linear guided waves in and around a borehole. The acoustic signals are excited to generate linear acoustic waves that are guided by the borehole and the surrounding formation. These linear guided waves have a wave mode and frequency, which are selected so that the linear guided waves generate nonlinear higher harmonics. In one embodiment, the linear wave modes are excited using low frequencies that are capable of penetrating a desired distance into the formation.

The nonlinear harmonics are detected by suitable transducers or receivers, and are analyzed to estimate properties of the formation. Such properties include petrophysical and mechanical properties such as lithology, porosity, permeability and saturation. In one embodiment, the amplitudes or other aspects of the detected nonlinear harmonics are analyzed to estimate the nonlinearity of the formation structure, which is used to estimate properties of the microstructure and mechanical or petrophysical properties such as formation porosity and water/hydrocarbon saturation. For example, the amplitude of higher harmonics detected by the receivers are measured and associated with the nonlinearity of the formation material. The amplitude of higher harmonics increases significantly with increasing nonlinearity of the material.

In one embodiment, the system and method are configured to evaluate cumulative behavior of nonlinear harmonics, i.e., the increase in amplitude of the nonlinear harmonics relative to propagation distance. The cumulative behavior is analyzed to estimate formation nonlinearity and mechanical properties of the formation.

Figure 1:
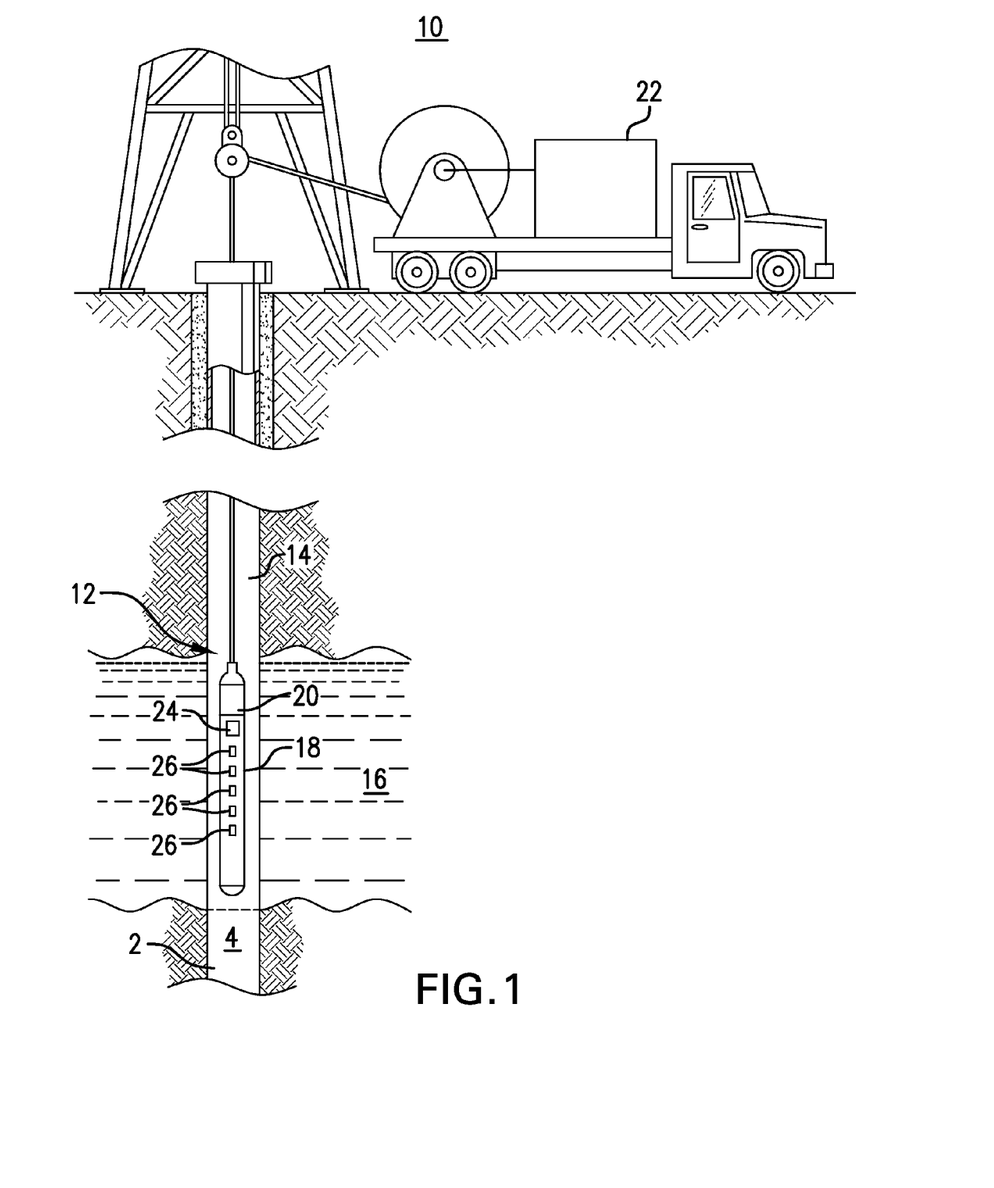
FIG. 1 depicts an embodiment of a system for evaluating or measuring a formation.

FIG. 1 illustrates aspects of an exemplary embodiment of a system 10 for performing energy industry operations such as formation measurement and/or evaluation, hydrocarbon production, completion and stimulation. The system 10 includes a borehole string 12 such as a wireline, pipe string, coiled tubing or other carrier disposed within a borehole 14 in an earth formation 16, which is suitable for lowering a tool or other component through a borehole or connecting a component to the surface. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, BHA's, frac ports and drill strings.

In one embodiment, the system 10 includes a measurement and data acquisition tool 18 configured to be disposed in the borehole 14 and advanced to an area or location of interest within the formation 16. The tool 18 is configured to perform measurements of the borehole and/or formation. Such measurements include acoustic measurements of the formation that entail emitting acoustic (e.g., sound and/or vibration) signals into the formation 16 to estimate characteristics thereof. It is noted that although the embodiments described herein are described in conjunction with vertical wells, they are not so limited, as they could be used with deviated, horizontal and any other boreholes having any selected path through a formation.

In one embodiment, the tool 18 and/or other downhole components are in communication with one or more processing units or devices, such as a downhole electronics unit 20 and/or a surface processing unit 22. The processing devices are configured to perform various functions including receiving, storing, transmitting and/or processing data from the tool 18. The processing devices include any number of suitable components, such as processors, memory, communication devices and power sources. Communication can be achieved via any suitable configuration, such as electrical or optical communication (e.g., via a communication cable), wireless communication and mud pulse telemetry.

In one embodiment, the tool 18 and/or the system 10 is configured for acoustic monitoring of the formation 16, in which acoustic waves or vibrations are transmitted into the borehole 14 and the formation 16. For example, the tool 18 includes one or more acoustic sources or transmitters 24 that emit acoustic energy pulses. One or more acoustic receivers 26, such as an axial array of receivers 26, are positioned along the tool 18.

In one embodiment, the tool 18 is configured to generate acoustic waves and excite non-linear guided waves for estimation of formation properties. In one embodiment, the tool 18 is configured to generate linear elastic guided waves, and detect non-linear higher harmonic guided waves. Analysis of these higher harmonic waves is used to estimate parameters of the formation. For example, non-linear parameters of the formation, such as porosity, can be estimated using the tool 18 and associated methods. It is noted that, although embodiments and methods are described in conjunction with the system 10, they are not so limited. The embodiments and methods described herein may be used with any device or system capable of generating acoustic guided waves.

A borehole is a natural waveguide for acoustic waves. Guided waves are acoustic waves that can propagate along the borehole under certain conditions. On the other hand, the rock formation in which the borehole is drilled may be a highly non-linear material. Embodiments described herein generate linear elastic guided waves that propagate along the borehole and in turn generate non-linear higher harmonic guided waves in the formation waveguide (i.e., the borehole). The higher harmonic guided waves propagate along the borehole. The generated amplitude of the non-linear higher harmonics is highly sensitive to the nonlinear properties of the formation which are determined by the petrophysical properties of formation such as porosity, water and hydrocarbon saturation, and micro-structures. It is shown herein that high amplitude (having an amplitude sufficient to allow estimation of nonlinear properties of the formation) nonlinear higher harmonics can be generated using specific transducers at low frequencies. These guided harmonic waves are used for highly accurate measurement of formation properties.

The tool 18 is configured to generate linear guided waves of wave modes and frequencies that excite nonlinear guided harmonic waves having a high amplitude at can be practically detected at one or more acoustic receivers and analyzed. In one embodiment, the linear guided waves and generated harmonics propagate at a relatively low frequency so that material attenuation does not significantly affect the amplitude of the wave during propagation. For example, the relatively low frequency is about 5-10 kHz for an acoustic transmitter or source disposed within the borehole, and is higher for an acoustic transmitter or source that is in contact with the borehole wall.

In order to excite nonlinear guided waves, suitable linear guided waves are excited. The linear guided waves propagate along the interface of the borehole and the formation (e.g., the borehole wall or casing). The energy of the linear guided waves will transfer to a nonlinear guided wave, thus generating nonlinear guided waves. A linear guided wave having a selected frequency and mode is chosen such that non-linear guided harmonics are generated that have a sufficient amplitude to be detected and analyzed.

In one embodiment, calculations are performed based on dispersion curves and displacement characteristics to select appropriate linear guided waves. These calculations are used to select the wave mode for the borehole structure that is to be excited, and the excitation frequency.

Figure 2:
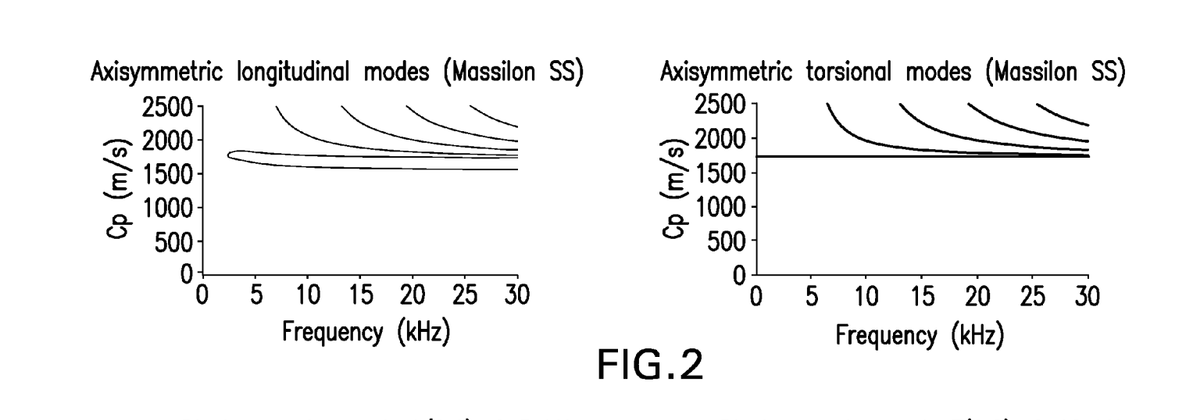
FIG. 2 depicts exemplary dispersion curves for a borehole that can be used in selecting linear guided waves.

Dispersion characteristics of various wave modes in a borehole may be used to select the wave mode and frequency of the linear guided waves. The dispersion characteristics are based on knowledge of the borehole and the formation, such as borehole dimensions and known formation material characteristics. FIG. 2 shows exemplary dispersion curves for axisymmetric longitudinal and torsional guided linear wave modes in an empty borehole. The dispersion curves show the phase velocity (Cp) of generated waves as a function of frequency, for multiple wave modes. In this example, the radius of the borehole is 200 mm and the formation material is Massilon sandstone. The following table shows linear properties of the formation material, including Lame constants $\lambda$ and $\mu$, and non-linear properties including third order non-linear constants l, M and n:

|  | Linear | | Non-linear elastic constants | | |
| --- | --- | --- | --- | --- | --- |
|  | $\lambda$ (GPa) | $\mu$ (GPa) | l (GPa) | M (GPa) | n (GPa) |
| Massilon SS | 1.9 | 6.3 | −7900 | −14435 | −17350 |

Figure 3:
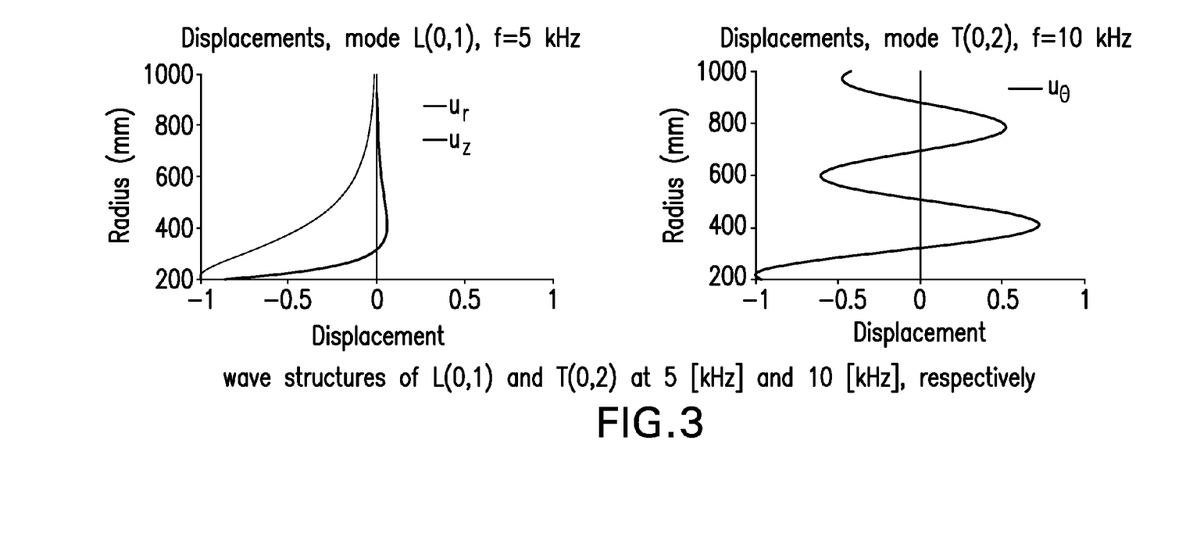
FIG. 3 depicts exemplary displacement curves for selected guided wave modes and frequencies.

Displacement characteristics of various modes are also used to select appropriate linear guided waves. The amplitude of displacement field components of a guided wave mode (wave structures) with respect to the distance from the axis of a borehole depends on frequency. FIG. 3 shows exemplary wave structures for longitudinal mode L(0,1) at 5 kHz and torsional mode T(0,2) at 10 kHz in a borehole. Curve 30 shows the displacement amplitudes $u_r$ in the radial direction, curve 32 shows displacement amplitudes $u_z$ in the axial direction (i.e., the borehole axis) and curve 34 shows the displacement amplitudes $u_\theta$ in the circumferential direction. The displacement field components or wave structure may be utilized to determine the required traction force direction to excite a specific mode.

In one embodiment, the primary linear guided wave mode and frequency are selected based on calculations of the power flux from a specific primary guided wave to nonlinear harmonics. The selected wave mode satisfies at least two conditions: the primary guided wave mode has a power flux that is greater than a selected threshold, and the primary guided wave mode generates at least one non-linear harmonic that is a guided propagating wave. The synchronism condition may be used to determine whether a generated non-linear wave is a guided propagating wave or an evanescent wave.

In one embodiment, the wave mode and frequency are selected based on dispersion curves or other measurements of optical characteristics of the borehole. For example, wave modes are selected from those points on dispersion curves that satisfy two conditions: they have high power flux to nonlinear harmonics, and the corresponding nonlinear harmonic is a guided propagating wave.

Various types of acoustic sources and transducers may be used to excite desired guided wave modes. Examples of such sources include interdigitated transducer (IDT), comb and angled beam sources. The transducers can be configured to excite acoustic waves in the formation fluid or at the borehole wall.

Figure 4:
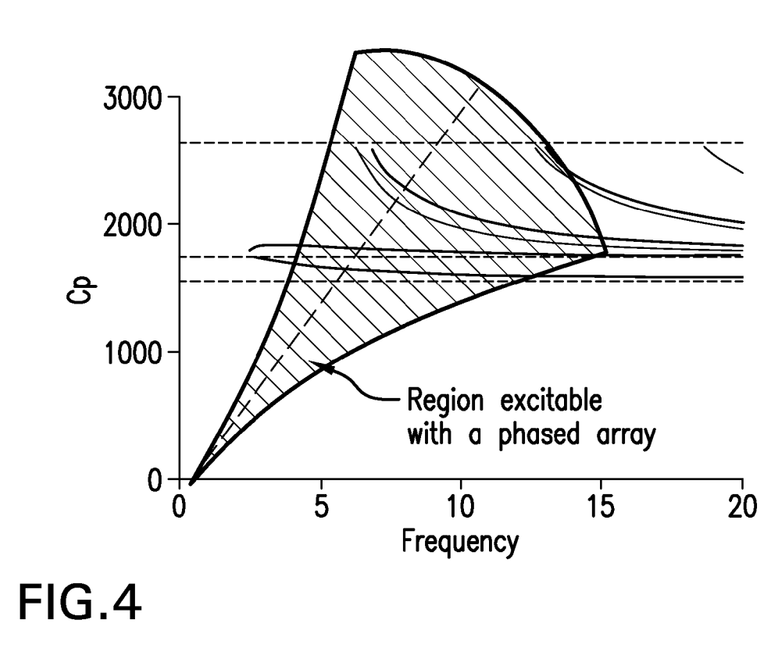
FIG. 4 depicts an exemplary acoustic transducer.

An exemplary IDT transducer source 36 is shown in FIG. 4. The transducer source 36 can be placed within a tool, e.g., in the mandrel of the tool, for exciting acoustic waves in borehole fluid, or can be placed in contact with the borehole wall for exciting waves at the fluid-formation interface. Alternating cylindrical transducer elements 38 and 40 are arrayed along the source 36. In this example, the space between two consecutive transducers should be a quarter of the desired wavelength and the transducer elements 38 are excited in a phase that is opposite the excitation phase of the transducer elements 40. An activation line 42 for a given spacing is shown relative to the longitudinal and torsional dispersion curves of FIG. 2. The activation line can be increased to an activation area 44 using time delays. One of the advantages of IDT and Comb transducers is that several transducers work together constructively to generate acoustic waves, therefore the amplitude of the generated waves are generally much higher than those generated by single element transducers.

Figure 5:
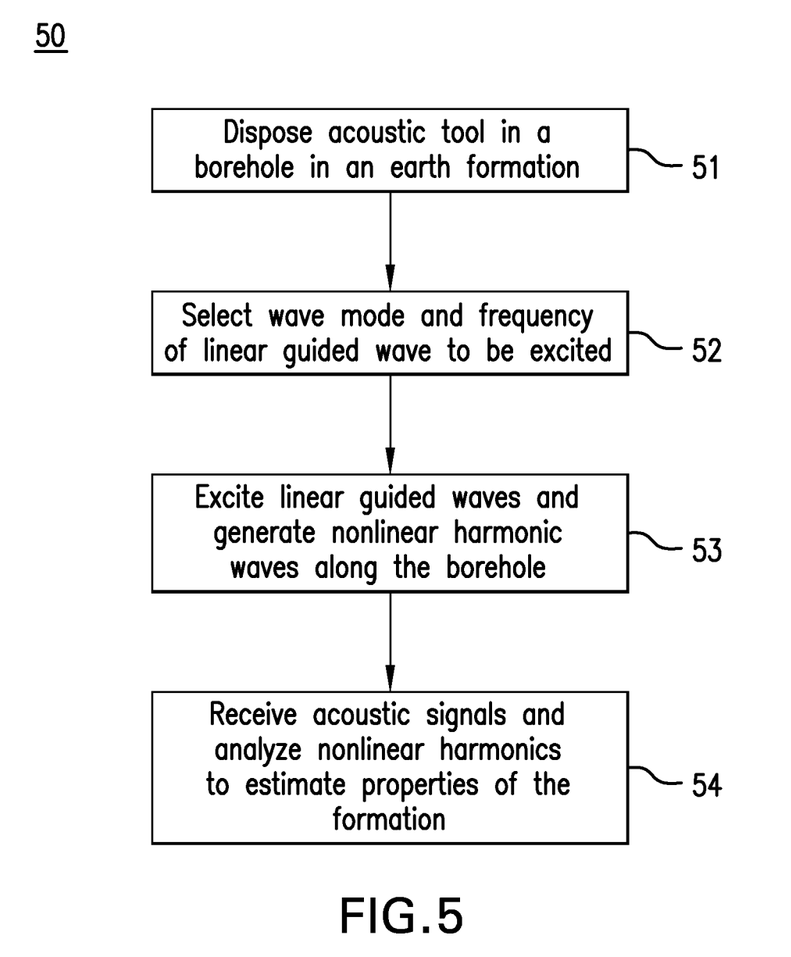
FIG. 5 is a flow chart illustrating an embodiment of a method of estimating properties of a formation.

FIG. 5 illustrates a method 50 for estimating characteristics or properties of a formation. The method 50 includes one or more stages 51-54. The method 50 is described herein in conjunction with a processor (e.g., the processing unit 22) that receives signal data, but is not so limited, and can be performed in conjunction with any number of processing devices. In one embodiment, the stages 51-54 are performed in the order described, although some steps may be performed in a different order or one or more steps may be omitted.

In the first stage 51, a carrier including an acoustic measurement device or tool is disposed in a borehole in an earth formation. For example, a tool such as the wireline tool 18 includes at least one IDT transducer device or other acoustic source. The tool also includes one or more acoustic receivers, e.g., the receivers 26.

In the second stage 52, the wave mode and frequency of a linear guided wave to be excited by the acoustic source are selected. The frequency and wave mode are calculated based on borehole characteristics (e.g., borehole diameter and tool configuration), which are used to select appropriate elastic guided wave modes and frequencies in which the energy of the primary mode can be transferred to secondary nonlinear modes. In one embodiment, the appropriate guided wave mode and frequency should are calculated based on the nonlinear guided wave propagation, power flux calculations, and synchronism conditions as discussed above.

For example, a suitable guided wave mode and frequency is selected that has produces a secondary nonlinear mode that is a guided wave, and that has a high power flux to the secondary mode. The nonlinear constitutive equation is solved in the cylindrical geometry of borehole. Based on these calculations, the power flux from primary mode to nonlinear harmonics is calculated. For the borehole and dispersion curve described relative to FIG. 2, these calculations suggest that the longitudinal mode L(0,1) at 7 kHz is a suitable mode. There may also be one or more, or many, other points on the dispersion curve that are suitable for nonlinear harmonic excitation.

In the third stage 53, the acoustic source is activated to generate a linear wave mode that is guided by the borehole. The source is excited to generate wave pulses having the frequency and wave mode selected above. In one embodiment, axisymmetric wave pulses having a selected wave mode or shape and having a selected frequency are generated and guided by the borehole.

The selected guided wave mode is excited using, e.g., comb or IDT transducers. Nonlinear harmonic waves (e.g., higher harmonics, half harmonics, difference harmonics) are generated when the predesigned primary guide wave mode is generated in the borehole. The acoustic signals generated by the transducers are detected and recorded by one or more receivers disposed at various distances from the transducers.

Figure 6:
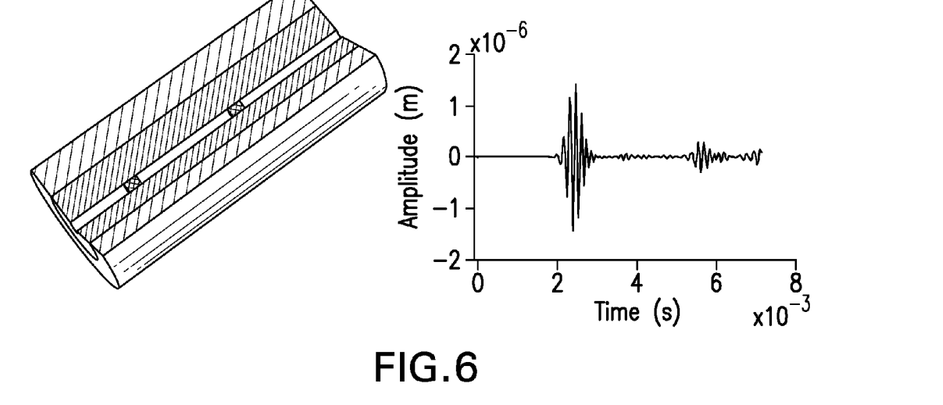
FIG. 6 depicts an exemplary acoustic transducer and linear guided wave pulse excited by the transducer.

An example of such excitation is shown in FIG. 6. An IDT transducer is disposed in a borehole, and a pure L(0,1) mode signal pulse 60 having a frequency of 7 kHz is excited using an IDT transducer. The wave propagates along the fluid-formation interface and received at a distance 4 m from the IDT transducer.

In the fourth stage 54, formation properties are calculated based on received harmonics. Petrophysical or mechanical properties of the formation are estimated by measuring the nonlinear harmonic waves generated by the linear guided waves. In one embodiment, nonlinear parameters of formation material such as porosity, water and hydrocarbon saturation, and micro-structures are estimated based on the amplitude of the harmonics. For example, porosity or other nonlinear properties are predicted based on the harmonic amplitudes. The prediction may be based on previous measurements of harmonic amplitudes and associated porosity values or value of other nonlinear properties.

In one embodiment, the amplitudes of the nonlinear harmonics are used to calculate the nonlinear coefficients of the formation. Petrophysical and mechanical properties such as porosity can be determined based on the coefficients, e.g., by relating porosity to nonlinear coefficient values.

For example, based on knowledge of the formation, such as the formation lithology, and the amplitude of the detected nonlinear harmonics, nonlinear elastic constants for the formation are estimated.

In one embodiment, the formation is analyzed to extract coefficients of Murnaghan's equation of state for a medium representing the formation. The medium assumed for the equations may be based on any suitable information relating to the formation. Such information may include lithology data, information regarding knowledge of the area in which the borehole is drilled, and other measurement information. For example, Murnaghan's third order constants are obtained based on estimations or assumptions of mechanical properties, such as elastic modulus, the shear modulus and Poisson's ration, based on previous knowledge of the formation. The constants are also based on the amplitudes of the detected nonlinear harmonic frequencies.

Figure 7:
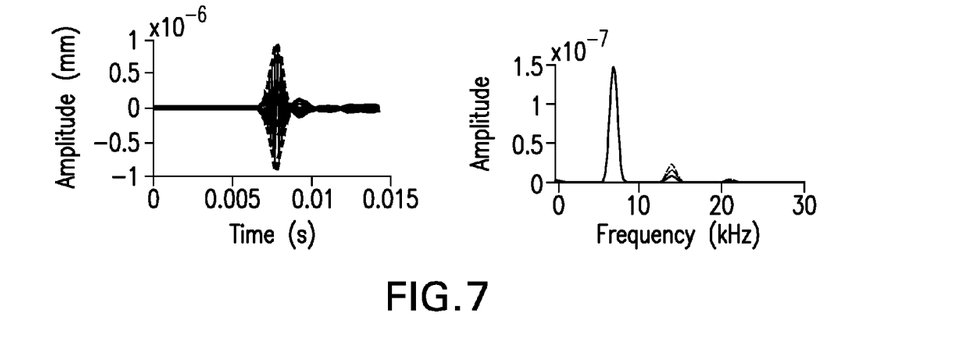
FIG. 7 depicts exemplary acoustic signals detected by an acoustic receiver located a selected distance from the transducer of FIG. 6.

FIG. 7 shows an example of acoustic signals 62 detected by receivers, the signals including nonlinear harmonics generated by the acoustic signal pulse 60 shown in FIG. 6. The acoustic signals 62 are received by a receiver located on the borehole wall when L(0,1) mode is excited using an IDT transducer at distance of 13 m from the receiver. The acoustic signals 62 include signals received by a receiver in a borehole surrounded by formation materials with different nonlinear elastic constants. In this example, the material is Massilon sandstone having three different sets of nonlinear elastic constants.

As shown in FIG. 7, the received acoustic signals are transformed from the time domain to the frequency domain (e.g., via Fourier transform), to identify the amplitudes of the nonlinear harmonic waves. For example, the frequency spectrum of FIG. 7 shows three frequency spectra. A first spectrum 64 corresponds to the borehole in a Massilon sandstone formation having nonlinear constants l=−7900, M=−14435 and n=−17350. A second spectrum 66 and a third spectrum 68 correspond to the borehole in a Massilon sandstone formation with the nonlinear constants being 50% less and 75% less, respectively, than the nonlinear elastic constants corresponding to the first spectrum 64. The graph shows that, with decreasing the nonlinear elastic constants, the amplitude of second and third harmonics at 14 kHz and 21 kHz decreases accordingly.

As demonstrated by the frequency spectra of FIG. 7, decreases in the nonlinear elastic constants lead to lower amplitudes for nonlinear harmonics. Thus, in one embodiment, the nonlinear elastic constants are calculated based at least on the amplitude of detected nonlinear harmonics, in conjunction with other known properties of the formation to estimate nonlinearities of the formation and associated nonlinear properties such as porosity.

In addition, the graph shows a clear distinction between three cases and suggests that the change in the nonlinear elastic constants can be detected clearly using the nonlinear harmonic amplitude. It is worth noting that the amplitude of higher harmonics for typical formations is much higher than metal. Therefore, the higher harmonics can be detected by the receivers in a practical situation in the borehole.

In one embodiment, measurement of nonlinear harmonics includes measurement of cumulative behavior of nonlinear harmonics. Cumulative behavior is another characteristic of nonlinear guided waves, and refers to the linear increase in the amplitude of nonlinear harmonics with respect to propagation distance.

Figure 8:
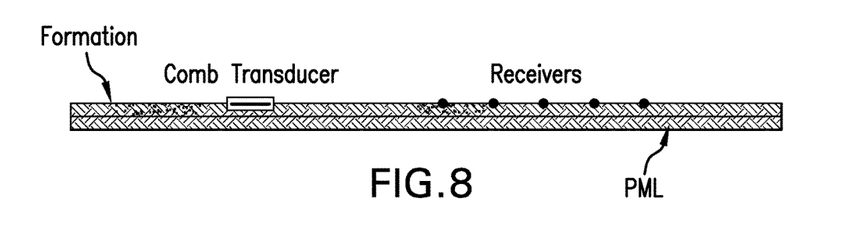
FIG. 8 depicts an embodiment of an acoustic measurement tool including an acoustic transducer and receiver array.

FIG. 8 shows an exemplary tool configuration for measurement of cumulative behavior. In this example, an acoustic source 70 is disposed at a position along a borehole, either in contact with the borehole wall, inside of a tool or component or otherwise disposed in the borehole. Multiple receivers 72 are disposed at different axial distances from the source 70, to measure the amplitude of harmonics at different propagation distances.

Figure 9:
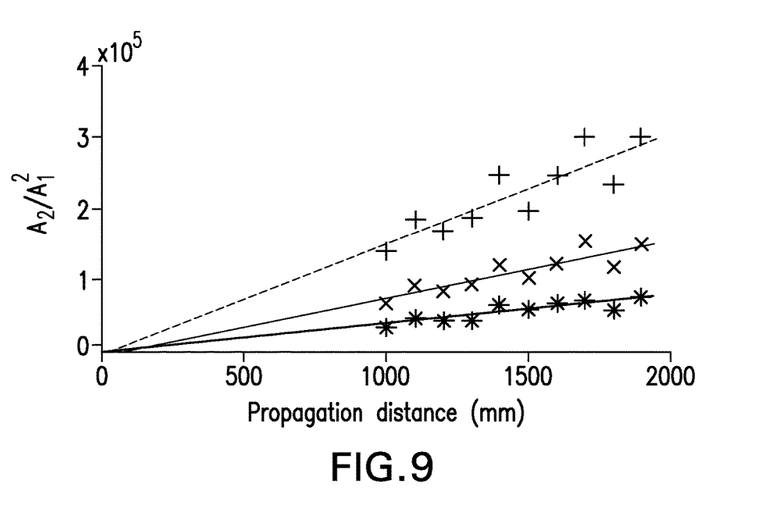
FIG. 9 depicts an example of acoustic data that indicates cumulative behavior of nonlinear harmonics generated by a linear guided wave.

As demonstrated by FIG. 9, the amplitude of nonlinear harmonics increases with increasing propagation distance, and the rate of increase gets higher as the nonlinearity of formation material increases. Thus, the amplitude and cumulative behavior can be correlated with nonlinear coefficient values or otherwise used to estimate nonlinear properties of the formation.

For example, FIG. 9 shows the cumulative behavior of mode L(0,1) at 7 kHz (the wave pulse of this mode is shown in FIG. 6). The amplitude of the second harmonic increases with increasing the propagation distance. Therefore L(0,1) generates a cumulative higher harmonics at 14 kHz. In addition, the amplitude of the second harmonic, shown as curves 74, 76 and 78, increases with nonlinearity.

Curve 74 corresponds to the borehole in a Massilon sandstone formation having nonlinear constants l=−7900, M=−14435 and n=−17350. Curves 76 and 78 correspond to the borehole in a Massilon sandstone formation with the nonlinear constants being 50% less and 75% less, respectively, than the nonlinear elastic constants corresponding to curve 74. The graph shows that, with decreasing the nonlinear elastic constants, the amplitude of second harmonics at 14 kHz decreases accordingly.

The embodiments described herein present numerous advantages. The embodiments provide devices and methods that result in acoustic formation evaluation that is more accurate than prior art methods. For example, methods described herein include generating and measuring nonlinear harmonics of guided linear waves. Such harmonics are significantly more sensitive to micro-structure properties (e.g., porosity) of formations than are the linear elastic waves that are typically used for formation evaluation. The embodiments described herein provide higher sensitivity to changes in nonlinear properties, e.g., changes in porosity and fluid saturation of a formation, such as shale stone formations where the pore size can be in the order of nanometers.

The embodiments described herein utilize high amplitude higher harmonics that can be generated at low frequencies in the borehole geometry. The amplitude of the higher harmonics guided waves is high and therefore is readily. In addition, the frequency of excitation can be small as, e.g., 3 kHz, so that the attenuation will not affect the wave significantly during propagation.

Generally, some of the teachings herein are reduced to an algorithm that is stored on machine-readable media. The algorithm is implemented by a computer or processor such as the processing unit 22 and/or electronics unit 20 and provides operators with desired output.

In support of the teachings herein, various analysis components may be used, including digital and/or analog systems. The devices, systems and methods described herein may be implemented in software, firmware, hardware or any combination thereof. The devices may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the devices and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. The computer executable instructions may be included as part of a computer system or provided separately.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of estimating a property of an earth formation, comprising:
disposing an acoustic tool in a borehole in an earth formation, the acoustic tool including an acoustic source and at least one acoustic receiver;
selecting a linear guided wave mode having a mode and frequency that are configured to induce non-linear harmonic guided waves that propagate along the borehole, the mode and the frequency selected based on dispersion characteristics of the formations;
transmitting acoustic signals into the borehole by the acoustic source, the acoustic signals having the linear guided wave mode that propagates along a surface of the borehole;
receiving the acoustic signals by at least one receiver, the acoustic signals including a harmonic of the linear guided wave mode, the harmonic generated by the formation in response to the linear guided wave mode and propagating along the borehole as the non-linear harmonic guided waves;
analyzing, by a processor, the acoustic signals to measure the non-linear harmonic guided waves; and
estimating a property of the formation based on the measured non-linear harmonic waves.

2. The method of claim 1, wherein the mode and the frequency are selected based on a power flux from the linear guided wave mode to a harmonic mode being above a selected threshold.

3. The method of claim 1, wherein estimating includes estimating at least one of a non-linear property and a mechanical property of the formation based on an increase in amplitude of the non-linear harmonic waves relative to propagation distance.

4. The method of claim 3, wherein analyzing includes calculating an amplitude of the non-linear harmonic guided waves, and estimating one or more nonlinear elastic constants based on the amplitude.

5. The method of claim 4, wherein analyzing includes calculating the amplitude of the non-linear harmonic guided waves at a plurality of distances from the acoustic source, and calculating an increase in the amplitude as a function of distance from the acoustic source.

6. The method of claim 3, wherein the non-linear property of the formation includes at least one of porosity, fluid saturation and micro-structure of the formation.

7. The method of claim 1, wherein the wave mode and the frequency are configured to generate the non-linear harmonic guided waves having an amplitude sufficient for detection by the at least one receiver, the non-linear harmonic guided waves resulting from interaction between the acoustic wave pulse and the formation as the acoustic wave pulse propagates along a surface of the borehole.

8. The method of claim 7, wherein the wave mode and the frequency are selected based on dispersion curves for multiple wave modes, the dispersion curves based on a geometry of the borehole.

9. The method of claim 1, wherein the property of the formation is estimated based on amplitudes of the non-linear harmonic guided waves.

10. The method of claim 1, wherein the acoustic source includes an inter-digit transducer disposed in the borehole.

11. A system for estimating a property of an earth formation, comprising:
an acoustic tool configured to be disposed in a borehole in an earth formation, the acoustic tool including an acoustic source configured to generate a linear guided wave mode that propagates along a surface of the borehole, the linear guided wave mode having a mode and frequency selected to induce non-linear harmonic guided waves that propagate along the borehole, the mode and the frequency selected based on dispersion characteristics of the formation;
a receiver configured to receive acoustic signals including a harmonic of the linear guided wave mode, the harmonic generated by the formation in response to the linear guided wave mode and propagating along the borehole as the non-linear harmonic guided waves; and
a processor configured to analyze acoustic signals received at the acoustic receiver, measure the non-linear harmonic guided waves, and estimate a property of the formation based on the measured non-linear harmonic waves.

12. The system of claim 11, wherein the mode and the frequency are selected based on a power flux from the linear guided wave mode to a harmonic mode being above a selected threshold.

13. The system of claim 11, wherein the processor is configured to estimate a non-linear property of the formation.

14. The system of claim 13, wherein the processor is configured to calculate an amplitude of the non-linear harmonic guided waves, and estimate one or more nonlinear elastic constants based on the amplitude.

15. The system of claim 14, wherein the processor is configured to calculate the amplitude of the non-linear harmonic guided waves at a plurality of distances from the acoustic source, and calculate an increase in the amplitude as a function of distance from the acoustic source.

16. The system of claim 13, wherein the non-linear property of the formation includes at least one of porosity, fluid saturation and micro-structure of the formation.

17. The system of claim 11, wherein the wave mode and the frequency are configured to generate the non-linear harmonic guided waves having an amplitude sufficient for detection by the at least one acoustic receiver, the non-linear harmonic guided waves resulting from interaction between the acoustic wave pulse and the formation as the acoustic wave pulse propagates along a surface of the borehole.

18. The system of claim 17, wherein the wave mode and the frequency are selected based on dispersion curves for multiple wave modes, the dispersion curves based on a geometry of the borehole.

19. The system of claim 17, wherein the property of the formation is estimated based on amplitudes of the non-linear harmonic guided waves.

20. The system of claim 11, wherein the acoustic source includes an inter-digit transducer disposed in the borehole.

* * * * *